Mar. 20, 1923.
H. S. JOHNSON.
AUTOMOBILE BODY CONSTRUCTION.
FILED AUG. 10, 1921.
1,449,231.
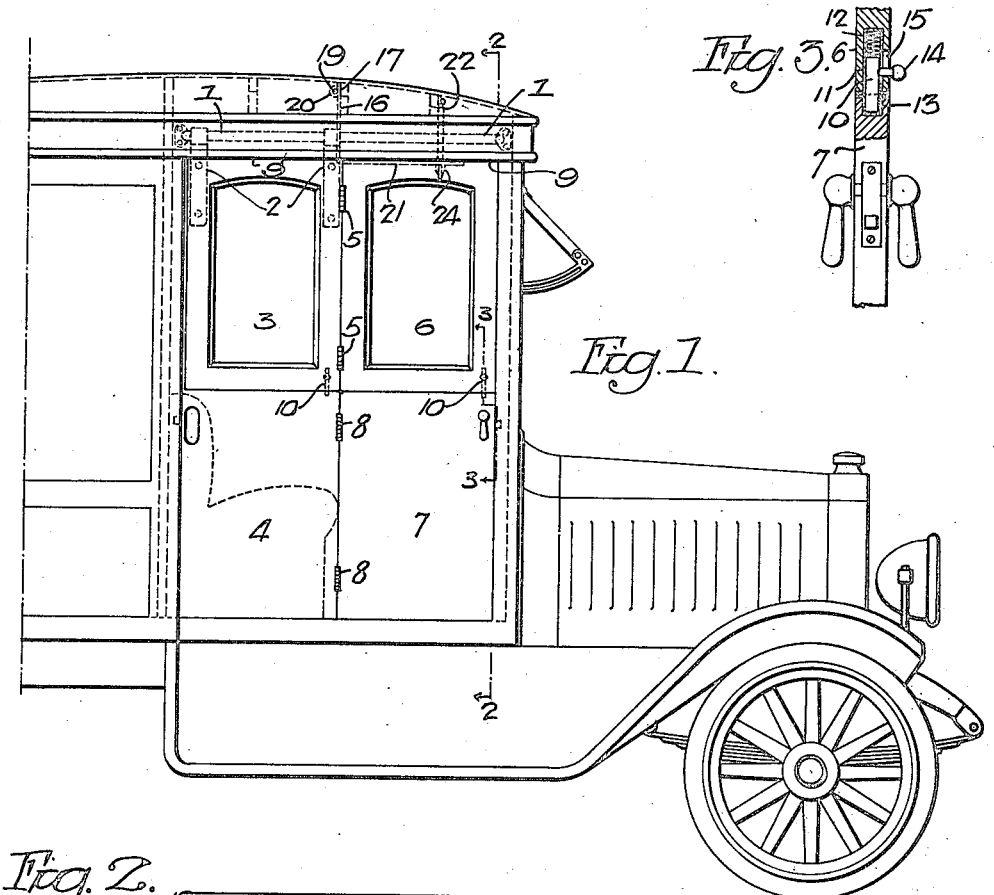
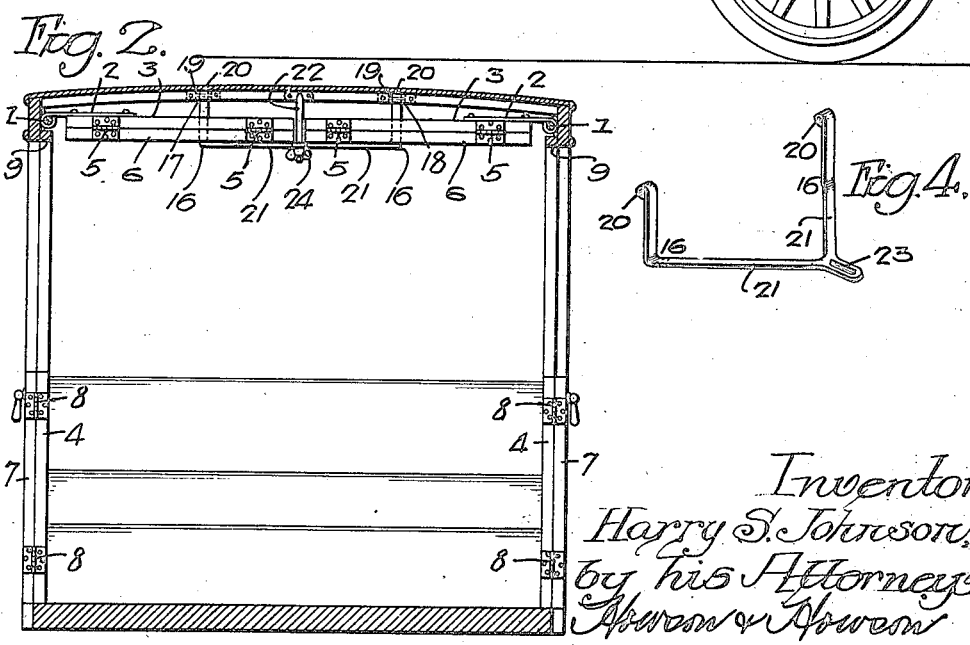
Inventor
Harry S. Johnson
by his Attorneys Patented Mar. 20, 1923.

1,449,231

UNITED STATES PATENT OFFICE.

HARRY S. JOHNSON, OF PITMAN, NEW JERSEY, ASSIGNOR OF ONE-HALF TO MALCOLM C. LUDLAM, OF WOODBURY, NEW JERSEY.

AUTOMOBILE BODY CONSTRUCTION.

Application filed August 10, 1921. Serial No. 491,164.

*To all whom it may concern:*

Be it known that I, HARRY S. JOHNSON, a citizen of the United States, residing in Pitman, New Jersey, have invented certain Improvements in Automobile Body Constructions, of which the following is a specification.

My invention relates to improvements in automobile body construction, the object of my invention being to provide side partitions particularly adapted for use in the driving cabs of trucks, which partitions are capable of being folded out of the way when it is desired to have an open cab.

The invention further resides in certain improving features of construction which render the construction extremely efficient and capable of quick adjustment to either the operative or inoperative positions.

In the attached drawings:

Figure 1, is a side elevation of the forward part of a motor vehicle equipped with side partitions made in accordance with my invention;

Fig. 2, is a transverse section on the line 2—2, Fig. 1;

Fig. 3, is a fragmentary section on the line 3—3, Fig. 1, and

Fig. 4, is a view in perspective of the clamping device.

With reference to the drawings, my device comprises a rail or other suitable rigid support 1 horizontally disposed at each side of the cab of a motor vehicle and at the top thereof, which rails carry by means of clamps 2, 2, side panels 3, to which the said clamps 2 are suitably secured, said clamps having at their tops eyes or loops through which the rail passes, as best shown in Fig. 2. The panel 3 is of the same width as the fixed side panels 4 of the motor vehicle, and there is attached to the panel 3 by means of hinges 5, 5, a second panel 6 which is substantially of the same width as the door 7 of the cab, which door is connected by means of hinges. 8 to the panel 4. The panels 3 and 6 are thus adapted when swung into a vertical position shown in Fig. 1, to completely close the space between the tops of the panel 4 and the door 7, and the top of the cab and the panels are so arranged that as they swing downward, the upper edges thereof fit neatly under the coping 9 of the top, the panel 6 when in this vertical position being capable of being turned outwardly upon the hinges 5 in the same manner as the door 7 is turned outwardly upon the hinges 8.

Suitable means is provided for securing the panels 3 and 6 to the panels 4 and the door 7 respectively, this means consisting in the present instance of a bolt 10 disposed in recesses 11 extending inwardly from the bottom edges of the panels 3 and 6 respectively, there being confined in the base of said recess a spring 12 which tends to force the said bolt downwardly into a recess 13 formed in the upper edges of the panels 4 and the door 7 whereby the said panel 3 is secured to the panel 4, and the panel 6 to the door 7. A suitable handle or knob 14 is provided on the bolt 10, which extends through a suitable slot 15 in the side of the panels 3 and 6 whereby the bolt may be elevated from the recess 13 when it is desired to separate the upper panels from the lower panel 4 and the door 7.

It will be noted that when the panel 6 is connected with the door 7 in the manner described, the said panel 6 forms a part of the door 7 and opens and closes with the door, constituting to all practical intents an integral part thereof.

As best shown in Fig. 2, the said panels 3 and 6 are capable of being swung inwardly and upwardly under the top of the cab, and suitable means is provided for retaining the panels in the elevated position in which they are entirely out of the way of the occupants of the cab. When turning the panels up, the panel 6 is first turned back against the panel 3, the panel 3 then moved forwardly on the rails 1 to an extreme forward position, and turned up, there being provided a clamp or bracket 16 which is hinged at 17 and 18 to the top of the cab by means of suitable spindles 19, which are secured to the said top and which pass through eyes 20 on the upturned ends of the said bracket. This clamp is adapted to be first swung backwardly to permit the swinging up of the panels, and is then swung forwardly so that the portion 21 underlies the inner ends of the panels, as best shown in Figs. 1 and 2, and there is provided means consisting in the present instance of a bolt 22 which extends downwardly from the roof of the cab and through a slot 23 in the forward end of the bracket 21, which bolt is provided with a wing nut 24 which, when screwed upon the end of the nut, holds the clamp or bracket in the elevated position, as shown in Fig. 1.

It will be noted that by extending the supporting rails forwardly to the front of the structure the panels may be shifted forwardly thereon, and when then turned up do not overlie the front seats of the vehicle.

I claim:

1. In a body structure for motor vehicles, the combination with a fixed panel and a door hinged thereto, of a panel suspended from the top of said structure overlying the fixed panel, a second panel hinged to said suspended panel and overlying the said door, means for securing the said panels to the said fixed panel and door which they respectively overlie, said suspended panels being adapted to be swung upwardly and inwardly to a substantially horizontal position underlying the top of the structure, and means for supporting the said panels in the latter position.

2. In a body structure for motor vehicles, the combination with a fixed panel and a door hinged thereto, of a horizontally disposed rail secured in the top of said structure above said panel and door, a panel suspended from the rail and adapted both to swing thereon and to move longitudinally thereof, a second panel hinged to said suspended panel, said latter panels being adapted respectively to overlie the said fixed panel and the door hinged thereto, means for securing the suspended panels respectively to the fixed panel and the door which they overlie, and means for supporting said suspended panels in a substantially horizontal position underlying the top of the structure, to which position they are capable of being swung around the said rail.

3. In a body structure for motor vehicles, the combination with relatively fixed side panels, of a horizontally disposed rail mounted in the top of said structure above the side panels and extending forwardly of the driver's position, panels suspended from the said rail and movable both around and longitudinally thereof, means for securing the lower edges of the suspended panels to the upper edges of the relatively fixed panels, and means for supporting the suspended panels in a substantially horizontal position underlying the said top and forwardly of the said driver's position.

HARRY S. JOHNSON.